United States Patent
Von Der Heide

(10) Patent No.: US 9,897,382 B2
(45) Date of Patent: Feb. 20, 2018

(54) METHOD AND DEVICE FOR TREATING EXHAUST GASES

(71) Applicant: Mehldau & Steinfath Umwelttechnik GmbH, Essen (DE)

(72) Inventor: Bernd Von Der Heide, Essen (DE)

(73) Assignee: Mehldau & Steinfath Umwelttechnik GmbH, Essen (DE)

( * ) Notice: Subject to any disclaimer, the term of this patent is extended or adjusted under 35 U.S.C. 154(b) by 40 days.

(21) Appl. No.: 14/763,390

(22) PCT Filed: Dec. 20, 2013

(86) PCT No.: PCT/EP2013/003899
§ 371 (c)(1),
(2) Date: Jul. 24, 2015

(87) PCT Pub. No.: WO2014/114320
PCT Pub. Date: Jul. 13, 2014

(65) Prior Publication Data
US 2015/0362255 A1     Dec. 17, 2015

(30) Foreign Application Priority Data

Jan. 25, 2013   (DE) .................. 10 2013 001 223
Mar. 7, 2013    (DE) .................. 10 2013 003 829

(51) Int. Cl.
*F28C 3/08*     (2006.01)
*B01D 53/56*    (2006.01)
*B01D 53/79*    (2006.01)

(52) U.S. Cl.
CPC ............. *F28C 3/08* (2013.01); *B01D 53/56* (2013.01); *B01D 53/79* (2013.01); *B01D 2251/2062* (2013.01); *B01D 2251/2067* (2013.01); *Y02E 20/14* (2013.01)

(58) Field of Classification Search
None
See application file for complete search history.

(56) References Cited

U.S. PATENT DOCUMENTS

| 6,773,555 B1 * | 8/2004 | Izutsu | B01D 53/505 204/157.3 |
| 7,513,100 B2 * | 4/2009 | Motter | F02C 3/30 60/39.3 |
| 2005/0000220 A1 * | 1/2005 | Zauderer | B01D 53/56 60/775 |
| 2006/0096292 A1 * | 5/2006 | Lilley | F01D 17/085 60/772 |

FOREIGN PATENT DOCUMENTS

WO      2012168758      * 12/2012

* cited by examiner

*Primary Examiner* — Sheng H Davis
(74) *Attorney, Agent, or Firm* — Edward E. Sowers; Brannon Sowers & Cracraft PC

(57) ABSTRACT

The present invention relates to a method for treating exhaust gases containing nitrogen oxide from technical processes, such as fume gases, for the purpose of removing or precipitationg the nitrogen oxide and/or for the purpose of reducing the nitrogen oxide content, in particular by chemically reducing the nitrogen oxide.

17 Claims, 1 Drawing Sheet

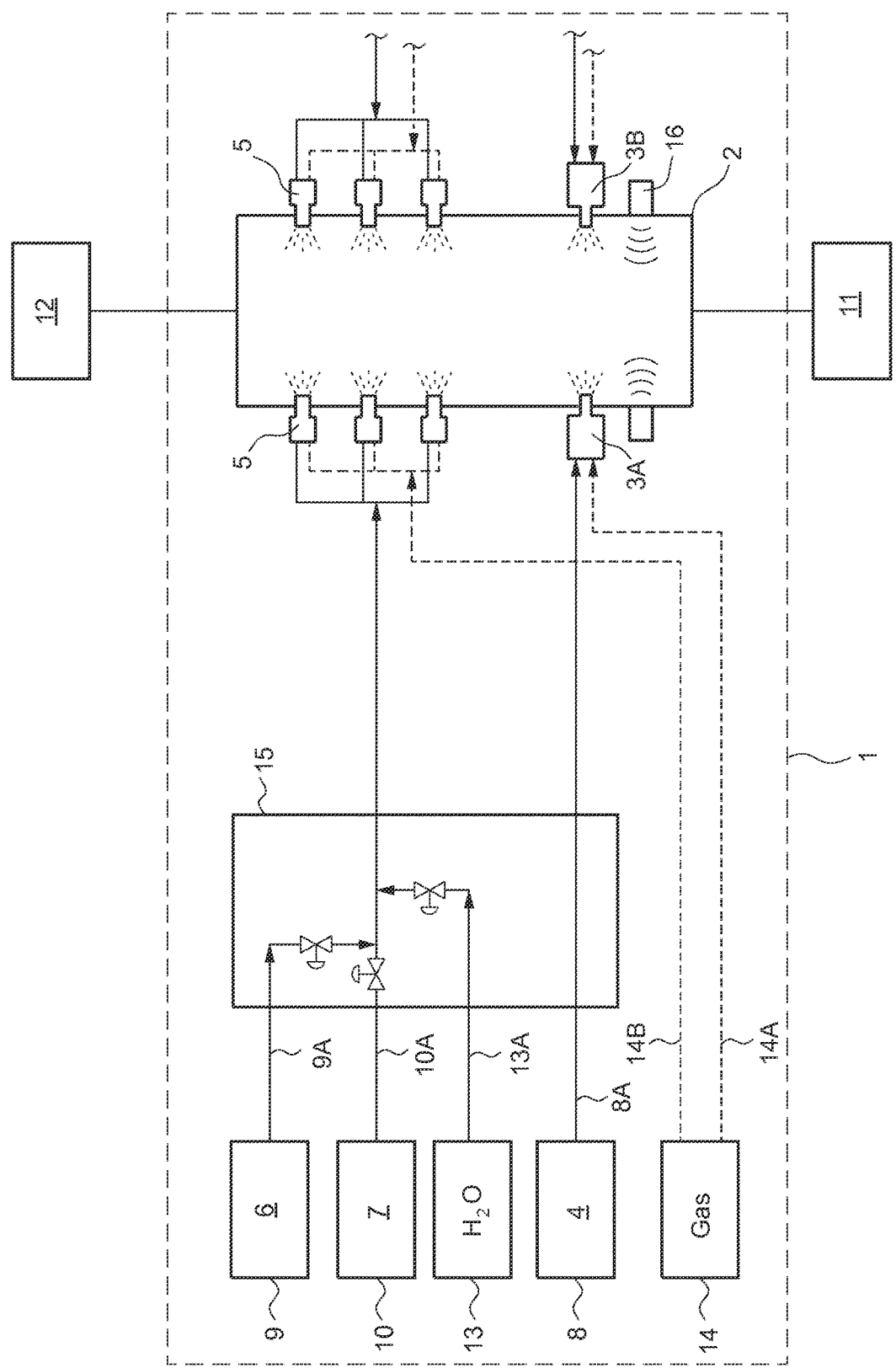

METHOD AND DEVICE FOR TREATING EXHAUST GASES

CROSS-REFERENCES TO RELATED APPLICATIONS

This application is a National Stage filing of International Application PCT/EP 2013/003899, filed Dec. 20, 2013, claiming priority to German Applications DE 10 2013 001 223.6 filed Jan. 25, 2013, and DE 10 2013 003 829.4 filed Mar. 7, 2013, entitled "METHOD AND DEVICE FOR TREATING EXHAUST GASES" The subject application claims priority to PCT/EP 2013/003899, and to DE 10 2013 001 223.6, and DE 10 2013 003 829.4 and incorporates all by reference herein, in their entirety.

BACKGROUND OF THE INVENTION

The present invention relates to the technical field of the treatment of exhaust gases, in particular the treatment of nitrogen oxide-containing exhaust gases.

The present invention relates in particular to a method for the treatment of nitrogen oxide-containing exhaust gases from technical processes, such as flue gases, for the purposes of removing and/or separating off the nitrogen oxides and/or for the purposes of reducing the nitrogen oxide content by means of chemical reduction of the nitrogen oxides. In particular, the present invention relates to a method for the denitrification of exhaust gases from large technical installations, such as for example power plants, in particular combined heat and power plants, or waste incineration installations.

Furthermore, the present invention relates to an apparatus for the treatment of nitrogen oxide-containing exhaust gases from technical processes, such as flue gases, for the purposes of removing and/or separating off the nitrogen oxides and/or for the purposes of reducing the nitrogen oxide content by means of chemical reduction of the nitrogen oxides.

Furthermore, the present invention relates to the use of an apparatus for removing and/or separating off nitrogen oxides from nitrogen oxide-containing exhaust gases from technical processes, in particular flue gases, and to the use of an apparatus for the selective cooling of flue gases from technical processes, in particular flue gases.

Finally, the present invention relates to a method for the treatment of exhaust gases from technical processes, in particular flue gases, preferably for the purposes of cooling the gases, in particular as part of a method for removing and/or separating off nitrogen oxides from exhaust gases from technical processes.

In the case of combustion reactions in the presence of air, metastable, generally poisonous and reactive oxides of nitrogen, so-called nitrogen oxides, are formed. The formation of nitrogen oxides is intensified by the combustion or thermolysis and pyrolysis of organic and inorganic nitrogen-containing compounds, such as occurs in large combustion installations such as combined heat and power plants or waste incineration installations.

Nitrogen oxides, in particular the compounds nitrogen monoxide and nitrogen dioxide, which are known under the designation "nitrous gases" and which are also referred to for short as $NO_x$, are however not only poisonous and lead to irritation and damage to the respiratory organs, but also promote the formation of acid rain, as they react with moisture to form acids.

The release of nitrogen oxides is however also a problem for additional environmental protection reasons, as they firstly promote the formation of smog and hazardous ground-level ozone and secondly, as greenhouse gases, intensify global warming.

Owing to the disadvantageous effects of nitrogen oxides on health and on the environment, and not least owing to the associated economic damage, it has already long been attempted to minimize or prevent the release of nitrogen oxides from combustion processes. In passenger motor vehicles, this is achieved for example through the use of catalytic converters, which permit an almost complete removal of the nitrogen oxides from the exhaust gases.

To reduce the nitrogen oxide emissions from large technical installations, in particular from large industrial combustion installations, taking into consideration the respective legal situation and business considerations, various methods for denitrogenization or denitrification (DeNOx) have been developed which, on their own or in combination, are intended to yield an effective reduction or elimination of nitrogen oxides in exhaust gases, in particular flue gases.

Methods or measures for reducing the nitrogen oxide content of exhaust gases, in particular flue gases, can in this case be divided into primary and secondary measures:

In the case of the primary measures, the combustion process is controlled such that the nitrogen oxide content in the resulting exhaust gases is as low as possible; it is the intention, in effect, that the nitrogen oxides should not arise in the first place. Primary measures include, for example, flue gas recirculation, wherein the flue gas is conducted again into the combustion zone, and air and fuel stages, wherein the combustion is controlled such that different combustion zones with different oxygen concentrations are realized. Furthermore, the formation of nitrogen oxides in flue gases can also be reduced through the addition of additives or by quenching, that is to say by the injection of water for the purpose of lowering the temperature during the combustion process.

By contrast to the primary measures, which are intended to prevent the formation of nitrogen oxides, the use of the secondary measures is intended to reduce the concentration of the nitrogen oxides in the exhaust gases, in particular flue gases. Secondary measures include for example separation methods, with which the nitrogen oxides are chemically bound or scrubbed out of the flue-gas flow. A disadvantage of the separation methods is however that large amounts of waste products are generated, such as for example process water, which are often contaminated with further flue gas constituents and must be disposed of in a costly manner.

Therefore, in modern large technical installations, as secondary measures, use is normally made of methods which are based on a reduction of the nitrogen oxides to form elementary nitrogen and which produce only small amounts of waste substances, wherein a distinction is generally made between catalytic and non-catalytic methods.

The selective catalytic reduction (SCR) of nitrogen oxides encompasses catalytic methods in which the nitrogen oxides are converted to form elementary nitrogen with the aid of metal catalysts. With SCR methods, it is generally possible to attain the best denitrification values, although the use of the catalyst makes the method considerably more expensive and less economically viable. Furthermore, installations for carrying out the SCR method are extremely expensive not only in terms of purchase but also in terms of maintenance, as the sensitive catalytic converters must undergo maintenance, or be replaced, at short time intervals. Specifically in the case of large combustion installations in which the fuel composition can often be determined only with inadequate accuracy, such as for example waste incineration installations, there is therefore always the risk of poisoning of the catalytic converters by contaminants in the flue gas. This risk can be reduced only through the implementation of additional expensive measures.

By contrast, selective non-catalytic reduction (SNCR) is based on the thermolysis of nitrogen compounds, in particular ammonia or urea, which then react with the nitrogen oxides in a comproportionation reaction to form elementary nitrogen.

Selective non-catalytic reduction can be carried out at considerably lower cost than selective catalytic reduction: the costs for the purchasing and maintenance of SNCR installations amount to just 10 to 20% of the costs of corresponding SCR installations.

A problem of the SNCR method is however that the effectiveness thereof does not come close to matching the effectiveness of catalytic methods, such that, for example in the event of a further reduction of the legally permitted limit values for nitrogen oxides in exhaust gases, in particular flue gases, most SNCR installations would no longer be allowed to continue operating.

A further disadvantage of the methods based on the selective non-catalytic reduction of nitrogen oxides is that excess reducing agent must be used, which reducing agent does not react completely, such that the exhaust gas contains a certain and in some cases not insignificant amount of ammonia. Excess ammonia in the exhaust gas must either be separated off, or reduced in terms of content by process engineering measures, so as to enable the exhaust-gas flow to be released to the environment.

Furthermore, there are also methods which are based both on a catalytic effect and on the use of reducing agents, though in the case of these methods, too, the main disadvantages of the respective methods (high costs for the use of catalytic methods, and low effectiveness in the case of the use of reducing agents) cannot be overcome.

Although, of late, novel SNCR installations have been developed which are based on the combined use of multiple reducing agents and which exhibit effectiveness virtually equivalent to that of catalytic methods, such installations however cannot provide optimum results under all operating conditions.

In particular in the case of combustion boilers being retrofitted with SNCR installations and during the operation of combustion boilers under full load, it is often the case that an injection of the reducing agent in a temperature range expedient for the SNCR method is not possible owing to the design of the boiler, or the temperatures that are expedient for the reduction are attained in the region of the heating surfaces or heat exchangers. In these cases, a major part of the flue gases, which may amount to up to 50% of the flue gas volume, cannot be reached by the reducing agent, or the reducing agent must be introduced into the exhaust-gas flow in an unfavorable temperature range. Furthermore, with the use of urea as reducing agent, there is, in the region of the heat exchangers, the risk of deposition of ammonia or ammonium salts and thus of corrosion.

The introduction or injection of the reducing agent into the flue-gas flow in the optimum temperature range is however critical for the effectiveness of the nitrogen oxide reduction and thus of the denitrification.

With the injection of the reducing agent above 1100° C., the reducing agent is increasingly oxidized to form nitrogen oxides, whereby firstly the nitrogen oxide rate of separation decreases and, secondly, the consumption of reducing agent increases. By contrast, if injection is performed at excessively low temperatures, the reaction rate decreases, whereby so-called ammonia slippage occurs which, over the further path travelled by the exhaust gases, in particular by the flue gases, leads to the formation of ammonia or ammonium salts. This gives rise to secondary problems such as, for example, contamination of the fly ash with ammonia or ammonium salts, the amount of which is considerably increased, and the disposal of which is also made more cumbersome and thus more expensive.

It has already been attempted to counteract this problem for example by arranging the heating surfaces or heat exchangers in movable fashion above the combustion boiler or injecting reducing agents by means of relatively long water-cooled injection lances. These modifications however also cannot prevent the occurrence of operationally induced temperature gradients, that is to say large temperature differences and different flows speeds in a plane perpendicular to the main flow direction of the exhaust gases, which have the effect that the reducing agents are not distributed uniformly over the entire boiler cross section. It is thus always the case that reducing agents are injected into flue gas regions which lie outside the effective temperature window or range. This in turn results in an inadequate degree of nitrogen oxide separation, high reducing agent consumption, and a high level of ammonia slippage.

To counteract these problems, tests have already been carried out in which water was additionally admixed to the reducing agents in order to cool the flue gases to the temperatures required for reduction. With this method, it is possible in individual cases to achieve improvements in the separating-off or removal of nitrogen oxides from the flue gases, wherein, however, the execution of the method overall remained unsatisfactory.

Accordingly, in the presence of low load in the combustion boiler and low flue gas temperatures, it would be necessary to reduce the amount of water in order to prevent excessive cooling of the flue gases. Since, during the injection, the droplet spectrum and thus the penetration depth and the distribution of the reducing agents in the exhaust-gas flow are dependent on the respective throughflow rate, an excessively low water quantity leads to an unfavorable distribution of the reducing agents in the flue gas and thus to a decreasing degree of separation of the nitrogen oxides and to increased consumption of reducing agents.

By contrast, in the case of falling flue gas temperatures, if the liquid quantity is kept constant, the droplet distribution or the droplet spectrum and thus the penetration depth and the distribution of the reducing agents in flue gases remain constant, but the flue gas is cooled to such an extent that the reduction conditions are unfavorable, and increased ammonia slippage results.

Finally, said method also does not solve the problem that, in many boiler installations, in particular ones equipped with a denitrification installation, the temperature window for effective and optimum reduction of the nitrogen oxides contained in the flue gases, in particular at full load of the boiler installation, often prevails in the poorly accessible narrow intermediate spaces in the region of the heat exchangers or heating surfaces. In said region, it is firstly difficult to actually achieve the entire flue gas volume with the reducing agent, and secondly, in particular with the use of urea, it cannot be ruled out that urea particles will impinge on the boiler tubes and heat exchangers or heating surfaces and lead to corrosion damage there. The use of urea solutions as reducing agent however cannot always be avoided owing to the greater penetration depth into the flue gas.

Overall, therefore, it is evident that, until now, there has not yet been developed an inexpensive and flexible method for the denitrification of exhaust gases from technical processes, such as flue gases, which method constantly permits good rates of separation of nitrogen oxides from exhaust gases from technical processes even in the case of adverse or unfavorable structural designs of the combustion boiler.

BRIEF SUMMARY OF THE INVENTION

The present invention is therefore based on the object of providing a method and an apparatus or installation for the treatment of nitrogen oxide-containing exhaust gases from technical processes, such as flue gases, for the purposes of removing or separating off the nitrogen oxides and/or for the purposes of reducing the nitrogen oxide content, preferably by means of chemical reduction of the nitrogen oxides, wherein it is the intention for the abovementioned problems and disadvantages that are encountered in conjunction with the prior art to be at least substantially eliminated or at least lessened.

In particular, it is an object of the present invention to provide an apparatus or installation suitable for carrying out said method, by means of which apparatus or installation exhaust gases from large technical installations can be denitrified, wherein the method and the apparatus or installation should be flexible in terms of use, in particular also suitable for retrofitting to existing combustion boilers, and which method and apparatus or installation attain the efficiency of selective catalytic reduction but with a cost outlay similar to that for conventional selective non-catalytic reduction.

It is furthermore an object of the present invention to provide a method with which flue gases are selectively cooled. In particular, it is an object of the present invention to provide a method with which flue gases are cooled to specific temperatures and thus prepared for further treatment.

The object presented above is achieved according to the invention by means of a method described herein including further advantageous refinements and configurations of the method according to the invention.

A further subject of the present invention is an apparatus or installation that provides advantageous refinements and configurations of this aspect of the invention.

A further subject of the present invention is the use of the apparatus according to the invention described herein.

A yet further subject of the present invention is the use of the apparatus according to the invention as described herein.

Finally, a further subject of the present invention is a method as also described herein that provides further advantageous configurations of this aspect of the invention.

It is self-evident that special aspects, features, configurations and embodiments and advantages or the like which—to avoid unnecessary repetition—are discussed below only with regard to one aspect of the invention may self-evidently also apply correspondingly in relation to the other aspects of the invention, without this having to be explicitly mentioned.

Furthermore, it is self-evident that, where values, numbers and ranges are specified below, such value, number and range specifications are not to be regarded as limiting; it is self-evident to a person skilled in the art that, in individual cases or depending on the application, the specified ranges or specifications may be deviated from without departing from the scope of the present invention.

Furthermore, all value or parameter specifications or the like mentioned below may basically be determined using standardized or explicitly specified determination methods, or else using determination methods that are familiar to an expert in this field.

On this basis, the present invention will be described in more detail below.

BRIEF DESCRIPTION OF THE DRAWINGS

FIG. 1 is a schematic illustration of the apparatus 1 according to the invention for carrying out a method according to the invention.

DETAILED DESCRIPTION OF THE INVENTION

The subject of the present invention—according to a first aspect of the present invention—is thus a method for the treatment of nitrogen oxide-containing exhaust gases from technical processes, such as flue gases, for the purposes of removing and/or separating off the nitrogen oxides and/or for the purposes of reducing the nitrogen oxide content, in particular a method for the denitrification of exhaust gases from large technical installations, wherein, (a) in a first method step, the exhaust gases are selectively cooled; and
(b) in a simultaneous and/or subsequent second method step, the nitrogen oxides are removed and/or separated off from the exhaust gases.

The present invention thus provides a method in which exhaust gases from technical processes, in particular flue gases, are firstly cooled and subsequently subjected to denitrification, that is to say the nitrogen oxides contained in the exhaust gases are removed or separated off from the exhaust gases. Owing to the selective cooling of the exhaust gases, these are optimally prepared for the further exhaust-gas treatment, in particular the removal or separating-off of nitrogen oxides. In particular, it is ensured that the further exhaust-gas treatment, in particular the removal or separating-off of the nitrogen oxides from the exhaust gases, takes place in an optimum temperature range.

The method according to the invention may be implemented both as an SCR method or as an SNCR method, as the SCR method also requires specific temperature windows for high efficiency.

In the context of the present invention, it is however preferable for the method according to the invention to be implemented as an SNCR method. The SNCR method is considerably easier and cheaper to implement than the SCR method; in particular, retrofitting of combustion boilers with SNCR installations is generally readily possible. Furthermore, the method according to the invention offers the possibility of eliminating the problems and disadvantages that are often encountered in the case of SNCR installations or methods, such as for example only low efficiency with regard to the denitrification of exhaust gases or the requirement for injection of the reducing agent into only poorly accessible regions of the installation owing to the fact it is only there that a temperature range expedient for the reduction prevails.

Through the selective cooling of the exhaust gases, it is possible to attain a specific temperature profile of the flue-gas flow. This may be configured so as to permit an optimum addition of the reducing agent; in particular, by means of the present invention, it is possible for the reducing agent to be selected or composed such that, with regard to the distribution in the exhaust-gas flow, the penetration depth and the reaction kinetics, it is optimally adapted to the temperature set in advance by the cooling, the flue-gas speed and the flue-gas flow rate.

Thus, with the method according to the invention, rates of separation of nitrogen oxides from exhaust gases are attained which are similar to those obtained with catalytic reduction methods, but with the cost advantages of an SNCR installation with regard to purchase and maintenance being maintained.

In particular, by means of the method according to the invention, it is likewise ensured that the volume of the exhaust-gas flow can be at least approximately completely treated with the reducing agent even in the case of an unfavorable structural design. For example, if the optimum temperature zone for the injection of reducing agents at full load of a combustion boiler lies in a region which is inaccessible or only poorly accessible owing to the structural design, such that an injection of the reducing agent is not possible or is possible only to an inadequate extent, it is possible, by means of the selective cooling, for the temperature range which is optimum with regard to the reduction to be shifted into more easily accessible regions of the installation. In this way, it is possible to treat even regions of the flue-gas flow which are otherwise inaccessible with an SNCR method.

By means of the method according to the invention, which comprises selective cooling of the exhaust gases, it is possible for even large temperature gradients, that is to say great temperature differences in the flue-gas flow, to be compensated, such that the nitrogen oxides can be removed or separated off from the flue gases in an efficient manner.

The method according to the invention thus surprisingly permits a considerably more efficient removal of nitrogen oxides from exhaust gases, in particular flue gases, wherein the efficiency or effectiveness of said method is similar to the efficiency of catalytic reduction methods.

In particular when using reducing agent mixtures such as, for example, mixtures of ammonia solutions and urea solutions, it is possible to realize an optimum mixture for the respectively set temperature profile, such that firstly, the rate of separation of the nitrogen oxides is considerably increased, and secondly, the ammonia slippage and the consumption of reducing agents are considerably reduced.

By comparison to known methods which are based on the use of multiple reducing agents, the method according to the invention is considerably easier and cheaper to implement and provides more constant rates of separation because, owing to the selective cooling and the resulting setting of a specific temperature profile of the flue gases, optimum conditions for the reduction of the nitrogen oxides to form elementary nitrogen are always obtained.

Furthermore, with the method according to the invention, it is also possible to avoid the corrosion of installation parts that occurs in the case of SNCR methods in the prior art in particular when using urea as reducing agent.

In the context of the present invention, it is generally the case that the selective cooling of the exhaust gases as per method step (a) is performed by virtue of at least one coolant being introduced into and/or contacted with the flow of exhaust gases from technical processes, in particular the flue gases.

The coolant is normally a cooling liquid, in particular a non-ignitable and/or inert cooling liquid, preferably water. Water is generally preferable as cooling liquid or as coolant as it is cheap to obtain and is available in large amounts. Furthermore, water is already used in most SNCR methods for the dissolving of the reducing agents and/or for the setting of a specific content of reducing agents in the reducing agent solution. In the case of water being used as coolant, it is thus possible to use the same water reservoir or the same installation parts for the supply of water as are used for the setting of the reducing agents.

In the context of the present invention, particularly good results are obtained if the coolant is introduced, in particular sprayed or injected, in finely distributed form into the exhaust-gas flow. Here, injection of the coolant has proven to be particularly efficient because, in a manner dependent on the design of the nozzles and pressurization and a throughflow rate coordinated therewith, a particularly optimum droplet spectrum and a flexibly adjustable depth of penetration of the coolant into the flue gases can be attained. The pressure required for the injection is in this case normally generated by way of compressed air or steam.

In the context of the present invention, the coolant is normally introduced into the exhaust-gas flow by means of injection devices, in particular injection lances. In this context, it has proven to be particularly advantageous if each injection device has one or more, in particular 1 to 20, preferably 1 to 15, preferably 1 to 10, particularly preferably 1 to 5, nozzles for introducing the coolant into the exhaust-gas flow. By means of a high number of nozzles, it is possible to realize a particularly uniform distribution of the coolant over the entire cross section of the exhaust-gas flow.

Particularly efficient cooling of the exhaust-gas flow is attained in particular if the injection devices are arranged in 1 to 10, in particular 1 to 7, preferably 1 to 5, preferably 1 to 3, injection planes, particularly preferably in one injection plane. For the majority of applications, it is adequate here for one injection plane to be provided for the introduction of the coolant into the exhaust-gas flow. However, if it is not possible to obtain the desired temperature profile using only one injection plane, it is also possible for multiple injection planes to be provided, wherein, if appropriate, temperature measurements are taken between the individual planes, and even reducing agent may be introduced into the flue-gas flow.

An arrangement of the injection devices in injection planes preferably perpendicular to the main direction of the exhaust-gas flow permits a particularly uniform distribution of the coolant and thus particularly uniform cooling of the exhaust-gas flow. This arrangement may however be deviated from if, for example, it is sought to cool only a part of the exhaust-gas flow, for example if said region can subsequently no longer be reached by way of further injection devices, for example between the heat exchangers or heating surfaces of combustion boilers.

In this context, it may be provided that each injection plane has 1 to 20, in particular 1 to 15, preferably 1 to 12, injection devices. Likewise, it may also be provided that the coolant is introduced into the exhaust-gas flow by means of 1 to 200, in particular 2 to 100, preferably 5 to 60, preferably 30 to 36, particularly preferably 1 to 12, injection devices.

In the context of the present invention, particularly good results are obtained if the injection devices are controlled individually and/or in groups, preferably individually.

Here, it may be provided that the discharge of coolant from the injection devices is controlled for each injection device individually and/or for groups of injection devices. Control of the injection devices in groups, and in particular individual control of the injection devices, permits particularly flexibly adjustable and effective cooling of the exhaust gases. It is thus possible for the exhaust gases to be cooled in targeted fashion, by injection of the coolant, at the locations at which the temperature range is not optimal for a reduction of the nitrogen oxides. By means of the flexible control of the injection devices, it is thus always possible to provide optimum conditions for the subsequent treatment, specifically the denitrification of the exhaust gases.

In one preferred embodiment of the present invention, the coolant is introduced into the exhaust-gas flow such that a desired, in particular preset, temperature profile of the exhaust-gas flow is set.

In this way, it is for example possible for a uniform temperature profile, in particular with a consistent temperature and/or a narrow temperature interval, to be set over the entire cross section of the exhaust-gas flow in a manner dependent on the respective requirements. It is however likewise also possible for a temperature profile with a non-uniform temperature distribution to be set.

Within the context of the present invention, the cross section of the exhaust-gas flow refers to a cross section perpendicular to the main flow direction of the exhaust gases.

A uniform temperature profile with an in particular consistent temperature is in this case basically preferred because, in this way, the best conditions for the subsequent reaction of the nitrogen oxides can be attained. With a uniform temperature profile, it is possible to attain considerably higher rates of separation of the nitrogen oxides with simultaneously considerably reduced ammonia slippage and considerably reduced reducing agent consumption.

The setting of a non-uniform temperature profile may however nevertheless be expedient and desirable for example if the optimum temperature range for the reduction of the nitrogen oxides in the flue gas prevails in a region of the installation which is inaccessible or only poorly accessible owing to the structural design, for example in the region of the heat exchangers or heating surfaces. Here, it is then selectively possible for that part of the flue-gas flow which, between heat exchangers or heating surfaces, can no longer be reached by means of injection devices to be cooled and subsequently have reducing agent added to it before entering the region of the heat exchangers. This problem arises in particular when combustion boilers are operated at full load or are retrofitted with SNCR installations. In these cases, with the use of the previous SNCR method, it may be the case that up to 50% of the exhaust-gas flow and thus of the nitrogen oxides cannot be reached only the reducing agent.

The method according to the invention furthermore permits the compensation of temperature gradients in the combustion boiler or in the exhaust-gas flow arising as a result of a non-uniform combustion of the fuel in the combustion boiler.

In the context of the present invention, it is generally provided that the introduction of the coolant into the exhaust-gas flow causes the exhaust-gas flow to be cooled in its entirety or in regions. In this connection, it may be provided that the entire cross section of the exhaust-gas flow is cooled and/or that selected regions of the cross section of the exhaust-gas flow, in particular perpendicular to the main flow direction of the exhaust-gas flow, are cooled.

In the context of the present invention, the reference to cooling of the exhaust-gas flow "in regions" is to be understood to mean that, by means of the introduction of the coolant into the exhaust-gas flow, at least individual sections or regions of a plane running perpendicular to the main flow direction of the exhaust gases are cooled.

Particularly good results with regard to the separating-off or removal of the nitrogen oxides from the exhaust gases are attained if the exhaust gases are cooled in particular at least in regions to temperatures in the range from 750 to 1200° C., in particular 800 to 1150° C., preferably 850 to 1100° C.

In this connection, it may be provided that the entire cross section of the exhaust-gas flow is cooled and/or that selected regions of the cross section of the exhaust-gas flow are cooled.

A particularly good reaction of the reducing agents with the nitrogen oxides contained in the exhaust gases is attained in the temperature ranges mentioned above, such that in said temperature ranges, the rate of separation of the nitrogen oxides is particularly high, while at the same time the ammonia slippage and the reducing agent consumption are particularly low.

Cooling in regions to the abovementioned temperatures is given consideration in particular whenever parts of the exhaust-gas flow pass through a part of the installation which is poorly accessible owing to the structural design but in which the optimum temperature range for a reduction of the nitrogen oxides prevails. Said specific part of the exhaust gases can then be targetedly cooled, and treated with reducing agents, before entering the poorly accessible or inaccessible regions, while the other regions of the exhaust-gas flow are not cooled and/or treated with reducing agents. As uniform a temperature profile of the exhaust-gas flow as possible is however always preferable, where possible.

The nitrogen oxides that are primarily removed in the context of the present invention are predominantly nitrous gases, that is to say nitrogen monoxide and nitrogen dioxide. Other nitrogen oxides are however also reliably removed from the exhaust-gas flow.

In the context of the present invention, it is preferable if the nitrogen oxides are separated off and/or removed from the exhaust gases by means of chemical reduction of the nitrogen oxides.

The method according to the invention, in particular the reduction of the nitrogen oxides, is generally performed in the absence of a catalyst. Thus, in the case of the method according to the invention, the high purchase and maintenance costs for a catalyst for the reduction of the nitrogen oxides are eliminated.

The method according to the invention is preferably carried out as selective non-catalytic reduction, in particular as an SNCR method.

In the case of the selective non-catalytic reduction (SNCR) of nitrogen oxides, reducing agents are normally injected in aqueous solution (such as ammonia water or aqueous urea solutions) or in gaseous form (such as for example ammonia) into the hot exhaust gases or flue gases. The reducing agents then react with the nitrogen oxides to form molecular nitrogen, water and carbon dioxide, as presented, based on the example of the reducing agents ammonia and urea, by way of the following reaction equations (1) and (2).

$$(NH_2)_2CO+2NO+\tfrac{1}{2}O_2 \rightarrow 2N_2+CO_2+2H_2O \quad (1)$$

$$4NH_3+4NO+O_2 \rightarrow 4N_2+6H_2O \quad (2)$$

The optimum temperature range in which a significant reduction of the nitrogen oxides is achieved normally lies in the range from 900 to 1100° C., depending on the flue gas composition. Above said temperature range, increasing amounts of ammonia are oxidized, that is to say additional nitrogen oxides form.

At temperatures below this, the rate of reaction decreases, resulting in so-called ammonia slippage which, over the course of the further flue gas path, can lead to the formation of ammonia salts or ammonium salts and thus to secondary problems such as corrosion; ammonia slippage should therefore be minimized.

Ammonia slippage is to be understood in particular to mean that part of the ammonia which does not react with the nitrogen oxides to form elementary nitrogen. The ammonia thus originates either from overdosing of ammonia or is a decomposition product from the thermolysis of nitrogen-containing reducing agents, for example urea.

For most applications, it has hitherto been the case that either urea or ammonia water has been used as reducing agent. For optimum nitrogen oxide separation with minimal ammonia slippage, the reducing agent must be mixed with the flue gases uniformly in the optimum temperature range. To achieve the impetus for complete mixing, a considerably greater amount of energy is required for ammonia water than for urea, as ammonia has a considerably higher vapor pressure.

Furthermore, aqueous solutions of urea and ammonia exhibit different reaction kinetics, this being based in particular on the fact that the urea dissolved in water can be split into reactive radicals only when the water surrounding the urea particles has completely evaporated, whereby a high depth of penetration into the exhaust gases is ensured with relatively little expenditure of energy.

By contrast, with the use of aqueous ammonia solutions, the ammonia evaporates immediately after entering the flue gases from the individual water droplets, such that the reaction takes place preferentially in the vicinity of the boiler walls. Thus, the partial pressure of ammonia reaches 1 bar at just 38° C. With the ammonia which is then present in gaseous form, the impetus required for the optimum depth of penetration of the reducing agents can, owing to the low mass in relation to a water droplet, be attained only by way of an increased expenditure of energy, for which purpose a corresponding steam or air flow rate must be considerably increased. In addition to the higher operating costs arising owing to the higher energy consumption, the investment costs for an installation operated with ammonia water are significantly higher owing to the safety requirements, as ammonia is a poisonous gas which is easily dissolvable in water at ambient temperature.

Ammonia water is therefore assigned to the water pollution class 2, and is furthermore, owing to the high potential risk to the environment, governed by the technical guidelines for steam boilers.

By contrast, owing to the chemical binding of ammonia in the urea molecule, urea solutions can be heated to 106° C. without ammonia gas evaporating out. The breakdown of urea into ammonia and carbon dioxide gas begins at 130° C. and reaches a maximum at approximately 380° C. Since such high temperatures cannot be reached during storage, the safety provisions required for ammonia water are not necessary. Urea solution is, in accordance with the German Water Resources Act (WHG), assigned only to the water pollution class 1 (that is to say it must merely be ensured that urea cannot pass into the groundwater, for which purpose a collecting trough for the storage tank is adequate).

However, urea solutions have the disadvantage that, in the event of overdosing of urea, said urea is deposited in solid form on parts of the installation and leads to undesired corrosion. This is all the more true as installations for carrying out SNCR methods are installed relatively directly downstream of the combustion chambers, that is to say even upstream of the heat exchangers that are normally provided. At high loads or at high outputs of the combustion boiler, an injection of the urea solution into the region of the heat exchangers may be necessary in order to permit efficient reduction of the nitrogen oxides. This however harbors the risk of solid urea being deposited on the heat exchangers and thus leading to corrosion of the parts, reducing the service life of the installation and considerably increasing operating costs.

According to the invention, it is preferable if at least one nitrogen-containing reducing agent is contacted with the nitrogen oxide-containing exhaust gases and/or introduced into the flow of the nitrogen oxide-containing exhaust gases.

Also, within the context of the present invention, it is generally provided that the contacting and/or the introduction of the reducing agent are/is performed such that the reducing agent reacts with the nitrogen oxides, in particular reduces the nitrogen oxides, preferably to form elementary nitrogen.

Furthermore, it has proven expedient for the reducing agent to be selected and used such that it reacts with the nitrogen oxides to form elementary nitrogen by comproportionation. Owing to the comproportionation of nitrogen oxides and nitrogen-containing reducing agent to form elementary nitrogen and preferably further gaseous components, the generation of further waste, which must be disposed of in an expensive manner, is prevented.

In the context of the present invention, it is preferable if the reducing agent used is in the form of an aqueous solution. In this context, it has proven to be expedient if, as reducing agent, use is made of ammonia and/or urea, in particular in the form of their aqueous solutions.

The introduction of the reducing agent into the nitrogen oxide-containing exhaust gases may be realized by way of a multiplicity of technical measures. Within the context of the present invention, it has however proven expedient for the reducing agent to be introduced, in particular sprayed or injected, in finely distributed form into the exhaust-gas flow. By way of injection in particular, it is possible to realize a fine distribution of the reducing agent with simultaneously excellent depth of penetration of the reducing agent into the exhaust-gas flow or flue-gas flow, permitting particularly effective reduction of the nitrogen oxides.

In this case, it has proven advantageous for the reducing agent to be introduced into the exhaust-gas flow by means of injection devices, in particular injection lances. The pressure required for injection is in this case normally generated by way of compressed air or steam.

In this case, it may be provided that each injection device has one or more, in particular 1 to 20, preferably 1 to 15, preferably 1 to 10, particularly preferably 1 to 5, nozzles for introducing the reducing agent into the exhaust-gas flow.

Particularly fine and uniform distribution of the reducing agent in the exhaust-gas flow is realized by means of a multiplicity of nozzles per injection device.

Likewise, it has proven advantageous in this regard for the injection devices to be arranged in 1 to 10, in particular 1 to 7, preferably 1 to 5, injection planes. By means of the arrangement of the injection devices in injection planes, it can be ensured that the entire reactor cross section or the entire width of the flue-gas flow can be covered by the reducing agent or the reducing agents.

In this case, it may be provided that each injection plane has 1 to 20, in particular 1 to 15, preferably 1 to 12, injection devices.

In general, the reducing agent is introduced into the exhaust-gas flow by means of 1 to 200, in particular 2 to 100, preferably 5 to 60, injection devices.

In the context of the present invention, it has proven to be particularly advantageous for the injection devices for introducing the reducing agent to be controlled individually and/or in groups, preferably individually.

Particularly good results are attained if the discharge of the reducing agent from the injection devices is controlled for each injection device individually and/or for groups of injection devices. The individual injection devices are preferably regulable individually or at least in groups, as the exhaust-gas flow, in particular the flue-gas flow, is not a homogenous structure but is subject to spatial and temporal fluctuations in terms of temperature and composition. Furthermore, in the context of the present invention, a non-uniform temperature profile of the exhaust gases may also be set, which may necessitate a different composition of the reducing agent or different pressures and penetration depths for the introduction of the reducing agent into the exhaust-gas flow.

To ensure particularly efficient use of the reducing agent, the injection devices are therefore advantageously regulable individually, that is to say the injection devices can advantageously be operated or deactivated individually, wherein the pressure and thus the depth of penetration of the reducing agent into the exhaust-gas flow can also be regulated individually for each injection device. It is particularly advantageous if the individual injection devices can be individually regulated not only with regard to their use and the injection pressure, but if the composition of the injected reducing agent, that is to say either individual reducing agents or the mixtures thereof, can be controlled individually and in a manner coordinated with the respective conditions.

The abovementioned individual controllability of all of the injection devices with regard to their operating parameters and the composition of the reducing agent duly leads to the best results but also increases the outlay in terms of process technology and thus the costs of the denitrification.

Likewise, very good results—but with considerably lower outlay in terms of process technology—are attained if the composition or the mixing ratio of the reducing agents is adjusted jointly for all injection devices or is adjusted jointly at least for all injection devices in one injection plane, but the individual injection devices can be individually regulated with regard to the injection pressure and the operating conditions or operating circumstances.

In the presence of relatively uniform and/or expected exhaust-gas flows, it is possible to attain very good results even if the injection devices are controlled in groups. In this case, a group of injection devices is to be understood to mean a defined and/or jointly actuable and/or combined unit of a multiplicity of injection devices, in particular injection lances.

Within the context of the present invention, it is generally provided that different injection devices are used for the coolant and for the reducing agents, in particular in different injection planes. In this way, in the context of the present invention, it is ensured that the cooling of the exhaust gases is performed, and can be regulated, independently of the injection or introduction of the reducing agents into the exhaust-gas flow.

As regards the temporal progression of the method according to the invention, it has proven to be expedient in the context of the present invention if the coolant is introduced into the exhaust-gas flow at the same time as and/or temporally prior to, preferably temporally prior to, the introduction of the reducing agent, and/or in that the coolant and the reducing agent are introduced into the exhaust-gas flow in alternation and/or in a defined sequence, preferably in a spatially and/or temporally, preferably spatially, defined sequence. In this context, it has proven to be advantageous in particular if, in the case of the initial introduction, the coolant is introduced into the exhaust-gas flow at the same time as and/or temporally prior to, preferably temporally prior to, the introduction of the reducing agent.

In the context of the present invention, it is thus generally provided and preferred that the coolant is introduced into the exhaust-gas flow first, whereupon the defined or desired temperature profile is set in the exhaust-gas flow. Subsequently, a reducing agent precisely adapted to said specific temperature profile, or a mixture of reducing agents, is injected into the exhaust-gas flow, whereby optimum results with regard to the rate of separation of nitrogen oxides, the ammonia slippage and the consumption of reducing agents are attained. It may however alternatively also be provided that the reducing agent is added at the same time as the coolant, but again preferably by means of respectively separate or different injection devices. In this way, the desired temperature profile is set in the presence of the reducing agents. Furthermore, it is however also possible for the coolant to firstly be added to the exhaust-gas flow and for the reducing agent to subsequently likewise be introduced into the exhaust-gas flow, wherein, if a reducing action is not adequate, further coolant and/or reducing agent can be introduced into the exhaust-gas flow, in particular after another determination of the temperature profile.

As regards the temperatures for the introduction of the reducing agent, these may vary in wide ranges. In the context of the present invention, however, particularly good results can be attained at temperatures in the range from 750 to 1200° C., in particular 800 to 1150° C., preferably 850 to 1100° C. In these temperature ranges, particularly good results are obtained in particular with aqueous ammonia or urea solutions.

In the context of the present invention, particularly good results are likewise obtained if the introduction of the coolant or of the reducing agent into the exhaust gases can be controlled in targeted and flexible fashion.

In an embodiment which is preferred according to the invention, the introduction of the coolant into the exhaust-gas flow, in particular the quantity thereof and/or the time of introduction, is controlled by way of an evaluation of the load signal and/or the determination of the exhaust-gas temperature.

In this case, it may be provided that the introduction of the coolant into the exhaust-gas flow is controlled by way of an evaluation of the load signal and/or by way of the determination of the exhaust-gas temperature.

In a preferred embodiment of the present invention, the introduction of the reducing agent into the exhaust-gas flow, in particular the quantity thereof and/or the time of introduction, is controlled by way of the determination of the exhaust-gas temperature and/or of the residual nitrogen oxide content in the purified gas that results from the treatment.

In this case, it may be provided that the introduction of the reducing agents into the exhaust-gas flow is controlled by way of an evaluation of the load signal and/or by way of the determination of the exhaust-gas temperature and/or by way of a comparison between, on the one hand, a measured value for the residual nitrogen oxide content in the purified gas that results from the treatment and, on the other hand, a predefined setpoint value. Furthermore, it is also possible for the ammonia slippage to additionally be determined and likewise taken into consideration in the process control.

In this case, in the context of the present invention, a load signal is to be understood to mean the indication of the respective load at which a combustion device, for example a large combustion installation, in particular a combustion boiler, is operated. Here, the load corresponds to the power output by the combustion device, and is normally specified in percent, wherein full load corresponds to (100%) of the power for which the combustion device, with optimum combustion and charging, is designed.

In the context of the present invention, it has furthermore proven to be particularly advantageous if the temperature of the exhaust gases is determined over the duration of the method at least at defined and/or predefined measurement points, and/or if at least one temperature profile of the exhaust gases, in particular in the form of one or more planes, is established, in particular by means of acoustic and/or optical temperature measurement, preferably acoustic temperature measurement. The determination of the spatially and temporally resolved temperature profile of one or more planes of the exhaust-gas flow permits targeted control of the individual injection devices, whereby firstly, the coolant and/or the reducing agent can be used in an effective manner, such that effective reduction of the nitrogen oxides takes place, and secondly, overdosing of the reducing agents in relation to the nitrogen oxides, which would lead to increased ammonia slippage, can be avoided. Likewise, overly intense or inadequate cooling of the exhaust gases is prevented.

What have proven to be particularly expedient in this connection are methods for acoustic temperature measurement, in particular acoustic gas temperature measurement, by means of which the true gas temperatures are determined, and temperature profiles calculated, over the combustion chamber cross section or the cross section of the exhaust-gas treatment device close to the injection points.

A system that is preferably used according to the invention is composed of mechanically and electrically identical emitter and receiver units, which are mounted on the walls of the exhaust-gas treatment device directly downstream of the combustion chamber, in particular combustion boiler, and an external control unit. During the measurement, a valve (for example solenoid valve) opens up a compressed-air line on the transmitter side, whereby acoustic signals are generated. The signals are recorded simultaneously at the emitter and receiver sides. From the digitalized signals, the propagation time can be determined. Since the distance covered is known, the speed of sound is obtained, which is converted into a temperature, the so-called path temperature. With multiple emitter/receiver units acting in combination in one plane, a multi-path configuration is obtained, by means of which the two-dimensional temperature distribution in a plane can be determined immediately and without delay.

Furthermore, it is however also possible for the temperature profile to be calculated on the basis of numerical flow dynamics in real-time (online CFD, computational fluid dynamics).

As regards the introduction of the coolant into the exhaust-gas flow, it has proven to be advantageous in the context of the present invention if, on the basis of the determined temperature values of the exhaust gases and/or of the determined temperature profile of the exhaust gases, the exhaust-gas flow is divided into sections, wherein the sections are assigned defined individual injection devices for introducing the coolant into the exhaust-gas flow and/or defined groups of injection devices for introducing the coolant into the exhaust-gas flow. In this way, it is achieved that, even in the presence of continuously changing exhaust-gas temperatures, the introduction of the coolant into the exhaust-gas flow can be dosed in such a manner that the desired temperature profile of the exhaust gases is obtained at all times. This makes the subsequent reduction of the nitrogen oxides in the exhaust gases very considerably easier.

In the context of the present invention, particularly good results are obtained if, on the basis of the determined temperature values of the exhaust gases and/or of the determined temperature profile of the exhaust gases, the exhaust-gas flow is divided into sections, wherein the sections are assigned defined individual injection devices and/or defined groups of injection devices for introducing the reducing agent. It is ensured in this way that, even in the presence of fluctuating exhaust-gas temperatures, the reducing agent reaches the locations which have the greatest effect for a reaction, and the installation is always operated in the optimum range with regard to the degree of separation of nitrogen oxides, the ammonia slippage and the reducing agent consumption.

As also regards the introduction of the coolant into the exhaust-gas flow, it has proven to be advantageous in the context of the present invention if the injection devices for introducing the coolant into the exhaust-gas flow are controlled, in particular individually or in groups, on the basis of the determined temperature values of the exhaust gases and/or on the basis of the determined temperature profile of the exhaust gases and/or on the basis of the load signal.

In an embodiment which is particularly preferred according to the invention, the injection devices for introducing the reducing agent are controlled, in particular individually or in groups, on the basis of the determined temperature values of the exhaust gases and/or on the basis of the determined temperature profile of the exhaust gases and/or on the basis of the load signal and/or on the basis of a comparison between, on the one hand, a measured value for the residual nitrogen oxide content in the purified gas that results from the treatment and, on the other hand, a predefined setpoint value.

In this connection, in the context of the present invention, particularly good results are obtained if the injection devices for introducing the coolant and the injection devices for introducing the reducing agent are controlled jointly on the basis of the determined temperature values of the exhaust gases and/or on the basis of the determined temperature profile of the exhaust gases and/or on the basis of the load signal.

In this context, it is particularly preferable if the injection devices for introducing the coolant and the injection devices for introducing the reducing agent are controlled in an inter-coordinated manner.

Through coordination or networking of the control of the injection devices for introducing the coolant, on the one hand, and the introduction of the reducing agent, on the other hand, it is possible in the context of the present invention to obtain particularly good results, as the composition and depth of penetration of the reducing agent is always optimally adapted to the set temperature profile. In this case, the temperature profile is conversely also dependent on the selection of the reducing agent or of the reducing agent mixture and the content of nitrogen oxides in the exhaust gases, the so-called $NO_x$ load.

For the control of the injection devices for introducing the coolant, the determined temperature of the exhaust gases and the flow rate of exhaust gas are of primary importance, whereas for the control of the introduction of the reducing agent, further factors such as the nitrogen oxide content in the exhaust gases also play a role.

In this context, it has proven to be advantageous if the injection devices for introducing the reducing agent are controlled additionally on the basis of a comparison between, on the one hand, a measured value for the residual nitrogen oxide content in the purified gas that results from the treatment and, on the other hand, a predefined setpoint value. In this way, the efficiency or the effectiveness with which the nitrogen oxides are separated off from the exhaust gases is checked at all times, and underdosing and overdosing of the reducing agent can be prevented or at least immediately compensated.

In the context of the present invention, particularly good results are obtained if, as reducing agent, at least two mutually different nitrogen-containing reducing agents are contacted with the nitrogen oxide-containing exhaust gases and/or are introduced into the flow of the nitrogen oxide-containing exhaust gases.

Furthermore, it has proven expedient for the mutually different reducing agents to be selected and used such that they react with the nitrogen oxides to form elementary nitrogen by comproportionation. Owing to the comproportionation of nitrogen oxides and nitrogen-containing reducing agents to form elementary nitrogen and preferably further gaseous components, the generation of further waste, which must be disposed of in an expensive manner, is prevented.

In the context of the present invention, particularly good results are obtained if the mutually different reducing agents react with the nitrogen oxides under mutually different reaction conditions, in particular at mutually different temperatures and/or under mutually different kinetic and/or thermodynamic conditions.

The mutually different reducing agents thus preferably differ not only in terms of their chemical composition but also in terms of their physical characteristics and/or their preferred reaction temperatures and reaction rates. In this way, it is possible, through targeted mixing of the at least two different reducing agents, to produce a new reduction reagent which can be adapted individually and flexibly to the respective application. Ideally, the reducing agents used differ in terms of their characteristics to such an extent that, by mixing them, an optimum range of action which is as broad as possible can be obtained.

As regards the introduction of the reducing agents into the nitrogen oxide-containing exhaust gases, it has proven to be advantageous if at least one reducing agent is used in the form of an aqueous solution. However, even better results are obtained if all reducing agents are used in the form of aqueous solutions. Through the use of aqueous solutions and the targeted variation of the concentrations of reducing agents in the respective solutions, the depth of penetration of the reducing agents into the exhaust-gas flow can be controlled in targeted fashion, whereby tailored and efficient use of the reducing agents is made possible.

It is preferably the case that ammonia, on the one hand, and urea, on the other hand, in particular in the form of their aqueous solutions, are used as mutually different reducing agents.

The use of ammonia solutions has the advantage that these can be obtained inexpensively on a large industrial scale, whereby the method according to the invention can be carried out at very low cost, and the ammonia readily evaporates out of the aqueous solution and reacts with the nitrogen oxides already close to the reactor wall. The latter advantage is however also a disadvantage, as it is often difficult or impossible with ammonia solutions to attain a depth of penetration into the flue-gas flow which permits efficient reduction of the nitrogen oxides.

By contrast, urea solutions have the advantage that, with these, a great depth of penetration into the flue-gas flow can be attained as the urea is broken down into $NH_2$ radicals, and can react with the nitrogen oxides, only after all of the water has been evaporated. On the other hand, however, with urea solutions, in particular when they are used in the vicinity of heat exchangers, there is the risk of corrosion of installation parts.

Through a targeted combination of both of the abovementioned reducing agents, in particular at respectively advantageous sites of action, it is however possible to avoid the respective disadvantages of the individual reducing agent and utilize only the advantages.

Both ammonia solutions and urea solutions can be easily stored in correspondingly designed tanks, wherein provision may be made for the respective solutions to be diluted with water again before or after any mixing that takes place.

If, in the context of the present invention, ammonia is used as one of the reducing agents, the ammonia is preferably provided and/or used in the form of an in particular aqueous solution with an $NH_3$ content of 10 to 35 wt %, in particular 15 to 30 wt %, preferably 20 to 30 wt %, preferably approximately 25 wt %.

If urea is used as one of the reducing agents for reducing the nitrogen oxide content of the exhaust gases, it has proven to be advantageous in the context of the present invention if the urea is provided and/or used in the form of an in particular aqueous solution with a urea content of 10 to 50 wt %, in particular 20 to 50 wt %, preferably 30 to 50 wt %, preferably 40 to 45 wt %, in relation to the solution.

It may likewise be provided that the aqueous urea solution or the aqueous ammoniacal solution has additional water added to it before introduction of the solution(s) into the exhaust-gas flow.

Both ammonia and urea solutions are commercially available in the abovementioned concentration ranges and are easy to store. The optional supplementary addition of further process water to the respective base mixtures permits targeted adjustment of the depth of penetration of the reducing agents into the flue gas and permits precise setting of the droplet size of the solutions of the reducing agent introduced into the exhaust-gas flow. This likewise has a positive influence on the reaction kinetics.

As regards the introduction of the reducing agent into the nitrogen oxide-containing exhaust gases, it may furthermore be provided that the mutually different reducing agents, in particular ammonia and urea, are introduced into the exhaust-gas flow temporally and/or spatially separately from one another.

It may however likewise be provided that the mutually different reducing agents are introduced into the exhaust-gas flow jointly, in particular after prior mixing.

In this case, for the most efficient and effective possible reduction of the nitrogen oxides in the exhaust gases, it has proven to be advantageous if, over the course of the method, the mutually different reducing agents are introduced into the flue-gas flow both temporally and/or spatially separately from one another and jointly after prior mixing.

The method according to the invention permits extremely flexible introduction of the reducing agent into the exhaust-gas flow, in particular flue-gas flow, in a manner adapted to the respective method conditions. Here, it may be provided that, over the course of the method, the reducing agents are used individually or as mixtures, that is to say over the course of the method, there may be alternation between the introduction of a single reducing agent and the introduction of mixtures of the reducing agents. In addition to this temporal separation of the introduction of the reducing agent or of the mixtures thereof, spatially separate introduction of the reducing agents or of the mixtures thereof is also possible. For this purpose, it may for example be provided that a single reducing agent is introduced at one location in the reactor, whereas the other reducing agent, or a mixture of reducing agents, is introduced at another location.

In the context of the present invention, if ammonia and urea are used as reducing agents, particularly good results can be obtained if ammonia and urea are introduced into the exhaust-gas flow in a weight-based ammonia/urea ratio of 99:1 to 1:99, in particular 95:5 to 5:95, preferably 9:1 to 1:9, preferably 7:1 to 1:7, more preferably 4:1 to 1:6, even more preferably 2:1 to 1:5. This applies in particular in the case of joint introduction of ammonia and urea. In the abovementioned ranges, particularly high efficiency can be observed in the denitrification of exhaust gases and in a synergistic interaction between ammonia, on the one hand, and urea, on the other hand, this being manifested not only in a considerable reduction of the nitrogen oxides but also in considerably lower consumption of reducing agents.

As regards the quantity of reducing agents in relation to the quantities of nitrogen oxides in the exhaust gases, this may vary in wide ranges. However, in the context of the present invention, particularly good results are obtained if the reducing agents, in particular ammonia and urea, are introduced into the exhaust-gas flow in such quantities that the molar ratio, in particular the equivalence ratio, between, on the one hand, the entirety of the reducing agents used and, on the other hand, nitrogen oxides to be reduced is set in the range from 1:1 to 5:1, in particular 2:1 to 4:1, preferably approximately 2.5:3.5. The equivalence ratio relates in this case to ammonia equivalents, which relates to the number of ammonia molecules or $NH_2$ radicals the nitrogen-containing reducing agents that are used break down into. Accordingly, one molecule of urea corresponds to two ammonia equivalents, as one molecule of urea breaks down into two $NH_2$ radicals under thermolysis.

As also regards the ratio of the reducing agents, it may be provided in the context of the present invention that the weight-based ratios of the reducing agents relative to one another, in particular the weight-based ratios of the mixture of the reducing agents, and/or the concentrations of the aqueous solutions of the reducing agents, are set identically for all injection planes, and/or are set individually for individual injection devices, in particular each injection device, and/or for groups of injection devices, preferably for each injection device.

The method according to the invention as discussed above permits, in relation to methods from the prior art, considerably improved reduction of the nitrogen oxides in exhaust gases, with a simultaneous reduction in the quantities of reducing agents used.

A further subject of the present invention—according to a second aspect of the present invention—is an apparatus (installation) for the treatment of nitrogen oxide-containing exhaust gases from technical processes, such as flue gases, for the purposes of removing and/or separating off the nitrogen oxides and/or for the purposes of reducing the nitrogen oxide content by means of chemical reduction of the nitrogen oxides, in particular an apparatus (installation) for the denitrification of exhaust gases from large technical installations, preferably for carrying out a method as described above, wherein the apparatus comprises:

(a) a reactor for contacting at least one coolant and for contacting and/or converting at least one reducing agent with the nitrogen oxide-containing exhaust gases, wherein the reactor has a multiplicity of injection devices, in particular injection lances, for the introduction, in particular injection, of at least one coolant and has a multiplicity of injection devices, in particular injection lances, for the introduction, in particular injection, of at least one nitrogen-containing reducing agent, wherein the injection devices can be regulated individually and/or in groups, preferably individually, (b) at least one storage device, in particular a reservoir vessel, which is in particular assigned to the reactor and which is preferably connected via at least one feed line to the injection devices and which serves for storing and/or releasing at least one coolant, and (c) at least one storage device, in particular a reservoir vessel, which is in particular assigned to the reactor and which is preferably connected via at least one feed line to the injection devices and which serves for storing and/or releasing at least one reducing agent.

As has been explained above in conjunction with the method according to the invention, the discharge of the coolant from the injection devices can be regulated for each injection device individually and/or for groups of injection devices.

In this context, it has proven to be advantageous if each injection device for introducing the coolant into the exhaust-gas flow has one or more, in particular 1 to 20, preferably 1 to 15, preferably 1 to 10, particularly preferably 1 to 5, nozzles.

In a preferred embodiment according to the invention, the injection devices for introducing the coolant into the exhaust-gas flow are arranged in 1 to 10, in particular 1 to 7, preferably 1 to 5, preferably 1 to 3, injection planes, particularly preferably one injection plane. In this context, it has proven to be expedient if each injection plane has 1 to 20, in particular 1 to 15, preferably 1 to 12, injection devices for introducing the coolant into the exhaust-gas flow. Particularly efficient and effective cooling of the exhaust-gas flow is attained in this way.

In general, in the context of the present invention, it is provided that the apparatus has 1 to 200, in particular 2 to 100, preferably 5 to 60, preferably 3 to 36, particularly preferably 1 to 12, injection devices for introducing the coolant into the exhaust-gas flow.

Furthermore, in the present invention, it is preferable if the discharge of the reducing agent from the injection devices can be regulated for each injection device individually and/or for groups of injection devices.

It may likewise be provided that each injection device for introducing the reducing agent into the exhaust-gas flow has one or more, in particular 1 to 20, preferably 1 to 15, preferably 1 to 10, particularly preferably 1 to 5, nozzles.

In this connection, it has proven to be expedient if the apparatus has 1 to 200, in particular 2 to 100, preferably 5 to 60, injection devices for introducing the reducing agent into the exhaust-gas flow.

In a preferred embodiment of the present invention, the injection devices for introducing reducing agent into the exhaust-gas flow are arranged in 1 to 10, in particular 1 to 7, preferably 1 to 5, injection planes.

Here, it may be provided in particular that each injection plane has 1 to 20, in particular 1 to 15, preferably 1 to 12, injection devices for introducing the reducing agent into the exhaust-gas flow.

Furthermore, in the context of the present invention, it is preferable if the injection devices are designed for introducing, in particular spraying, preferably injecting, aqueous solutions of the reducing agent, in particular aqueous ammonia and/or urea solutions.

In this context, it has proven to be advantageous if the apparatus comprises:

(c1) at least one first storage device, in particular a first reservoir vessel, which is in particular assigned to the reactor and which is preferably connected via at least one feed line to the injection devices and which serves for storing and/or releasing at least one first reducing agent, and (c2) at least one second storage device, in particular a second reservoir vessel, which is in particular assigned to the reactor and which is preferably connected via at least one feed line to the injection devices and which serves for storing and/or releasing at least one second reducing agent which differs from the first reducing agent.

In general, in the context of the present invention, it is provided that the apparatus is connected downstream, in particular directly downstream, of a combustion device, in particular of a combustion boiler.

In this connection, it has proven to be particularly advantageous if the apparatus is arranged between a combustion device and a heat-exchange device. In this way, it is possible to obtain the best rates of separation in the removal or separating-off of the nitrogen oxides with simultaneously reduced consumption of reducing agent and low ammonia slippage.

Alternatively, however, it may also be provided that the apparatus is connected downstream of a combustion device, in particular of a combustion boiler, and extends into the region of a heat-exchange device. In particular if existing combustion boilers or heating boilers are equipped with the apparatus according to the invention, it may occur, owing to the temperature distribution and the structural design, that the apparatus according to the invention, in particular the injection lances, are situated in the region of the heat-exchange devices and/or the heating surfaces of the installation or of the large combustion installation.

Likewise, it has proven to be advantageous in the context of the present invention if the apparatus has at least one water storage device for storing and/or releasing water.

In this case, it may be provided in particular that the water storage device is assigned to the reactor and is preferably connected via at least one feed line to the injection devices for introducing the reducing agent. In the execution of the method according to the invention, the water is required in particular for the precise setting of the specific concentration ratios of the reducing agent before the injection or introduction thereof into the apparatus according to the invention. Since, in the context of the present invention, water is also used as the preferred coolant, in this case only one reservoir vessel is required both for the storage of the coolant and for the production or mixing of the reducing agent.

Furthermore, in the context of the present invention, it is generally provided that the apparatus has at least one gas storage device for storing and/or releasing possibly compressed gases, in particular compressed air. Here, it may be provided that the gas storage device is assigned to the reactor and is preferably connected via at least one feed line to the injection devices for introducing the coolant into the exhaust-gas flow. Alternatively, it may also be provided that the apparatus has at least one gas storage device for storing and/or releasing possibly compressed gases, in particular compressed air.

In this case, it has proven to be advantageous if the gas storage device is assigned to the reactor and is preferably connected via at least one feed line to the injection devices for introducing the reducing agent into the exhaust-gas flow.

It is likewise generally provided according to the present invention that the pressurization of the injection devices for the purposes of discharging the coolant into the reactor can be performed by means of the gases stored in the gas storage device, and/or that the pressurization of the injection devices for the purposes of discharging the reducing agent into the reactor can be performed by means of the gases stored in the gas storage device.

In the context of the present invention, it may however also be provided that different gas storage devices or respectively separate gas storage devices are used for the discharge of the coolant and for the discharge of the reducing agent. This has no effect on the mode of operation of the apparatus according to the invention, but is solely due to the structural circumstances. Likewise, it is also possible for the same or separate control units to be used for controlling the pressurization for the discharging of the coolant and the discharging of the reducing agent.

In the context of the present invention, it has proven to be particularly advantageous if the apparatus has at least one dosing and/or mixing device.

In this context, it may be provided that the dosing and/or mixing device is connected to the storage devices for the provision of the reducing agent and to the injection devices for the provision of the reducing agent and to the injection devices for the introduction of the reducing agent into the exhaust-gas flow and to the water storage device that may be provided.

Furthermore, it may be provided that the dosing and/or mixing device is designed such that the concentrations of the aqueous solutions of the reducing agent can be regulated identically and/or can be individually regulated for individual injection devices, in particular for each injection device, for introducing the reducing agent into the exhaust-gas flow and/or for groups of injection devices for introducing the reducing agent into the exhaust-gas flow, preferably for each injection device for introducing the reducing agent into the exhaust-gas flow.

Furthermore, it has proven to be advantageous if the dosing and/or mixing device is designed such that the weight-based and/or volume-based ratios of the reducing agents relative to one another, in particular the weight-based and/or volume-based ratios of mixtures of the reducing agents, and/or the concentrations of the aqueous solutions of the reducing agents can be regulated identically and/or can be individually regulated for individual injection devices, in particular for each injection device, for introducing the reducing agent into the exhaust-gas flow and/or for groups of injection devices for introducing the reducing agent into the exhaust-gas flow, preferably for each injection device for introducing the reducing agent into the exhaust-gas flow.

In a preferred embodiment of the present invention, it is provided that the introduction of the coolant into the exhaust-gas flow can be controlled by way of a determination of temperature values of the exhaust gases and/or by way of a determination of a temperature profile of the exhaust gases and/or by way of a load signal and/or that the introduction of the reducing agent into the exhaust-gas flow can be controlled by way of a determination of temperature values of the exhaust gases and/or by way of a determination of a temperature profile of the exhaust gases and/or by way of a load signal and/or by way of a comparison between, on the one hand, a measured value for the residual nitrogen oxide content in the purified gas that results from the treatment and, on the other hand, a predefined setpoint value.

In the context of the present invention, particularly good results are obtained if the introduction of the coolant and the introduction of the reducing agent into the exhaust-gas flow can be coordinated with one another. In this way, in the context of the present invention, in particular in the context of the method execution according to the invention, special synergistic effects can be obtained, in particular with regard to a particularly high rate of separation of the nitrogen oxides out of the exhaust gases to be purified and a considerable reduction in reducing agent consumption and ammonia slippage.

In general, in the context of the present invention, it is provided that a temperature profile of the exhaust-gas flow can be set by way of the introduction of the coolant.

In this case, it may be provided in particular that a uniform temperature profile or a non-uniform temperature profile of the exhaust-gas flow can be set.

As also regards this aspect of the apparatus according to the invention, it has proven to be advantageous if the exhaust-gas flow can be set—in particular at least in regions—to temperatures in the range from 750 to 1200° C., in particular 800 to 1150° C., preferably 850 to 1100° C., by way of the introduction of the coolant. Extremely effective reduction of the nitrogen oxides contained in the exhaust gases is possible in this temperature range.

In a particularly preferred embodiment of the present invention, it is provided that the apparatus has at least one measurement device for determining temperature values of the exhaust gases and/or for determining a temperature profile of the exhaust gases and/or for determining a load signal and/or for determining a value for the residual nitrogen oxide content in the purified gas that results from the treatment, in particular for the purposes of controlling the introduction of the coolant and/or of the reducing agent into the exhaust-gas flow.

In this connection, it has proven to be expedient in the context of the present invention if the apparatus has, arranged in particular upstream of the injection devices for introducing the coolant, a measurement device for determining the temperature of the exhaust gas and/or for establishing a temperature profile of the exhaust gas, in particular by means of acoustic or optical temperature measurement, preferably by means of acoustic temperature measurement. Further measurement devices may also be provided for monitoring purposes.

Also in this connection, it may be provided that the temperature is determined multiple times over the course of the method or as the flue gases or exhaust gases flow through the apparatus.

For further details relating to the apparatus or installation according to the invention, reference may be made to the above statements regarding the method according to the invention, which apply correspondingly with regard to the apparatus or installation according to the invention.

A further subject of the present invention—according to a third aspect of the present invention—is the use of an apparatus as described above for removing and/or separating off nitrogen oxides from nitrogen oxide-containing exhaust gases from technical processes, in particular flue gases.

For further details relating to this aspect of the invention, reference may be made to the above statements regarding the method according to the invention and/or with regard to the apparatus according to the invention, which apply correspondingly with regard to the use according to the invention.

Furthermore, a further subject of the present invention —according to a fourth aspect of the present invention —is the use of an apparatus as described above for the selective cooling of exhaust gases from technical processes, in particular flue gases.

For further details regarding this aspect of the invention, reference may be made to the above statements regarding the further aspects of the invention, which apply correspondingly with regard to the use according to the invention.

Finally, a further subject of the present invention—according to a fifth aspect of the present invention—is a method for the treatment of exhaust gases from technical processes, in particular flue gases, preferably for the purposes of cooling the exhaust gases, in particular as part of a method for removing and/or separating off nitrogen oxides from exhaust gases from technical processes, in particular as part of a method for the denitrification of exhaust gases from large technical installations, wherein the exhaust gases are selectively cooled and/or wherein the flow of the exhaust gases to be treated is subjected to selective cooling.

In general, it is provided in the context of the present invention that at least one coolant is introduced into and/or contacted with the flow of the exhaust gases from technical processes, in particular of the flue gases.

In the context of the present invention, it is preferable if the coolant is a cooling liquid, in particular a non-ignitable and/or inert cooling liquid, preferably water.

Furthermore, very good results are obtained if the coolant is introduced, in particular sprayed or injected, in finely distributed form into the exhaust-gas flow.

It has likewise proven expedient if the coolant is introduced into the exhaust-gas flow by means of injection devices, in particular injection lances.

In this case, it may be provided that each injection device has one or more, in particular 1 to 20, preferably 1 to 15, preferably 1 to 10, particularly preferably 1 to 5, nozzles for introducing the coolant into the exhaust-gas flow.

In a preferred embodiment of the present invention, the injection devices are arranged in 1 to 10, in particular 1 to 7, preferably 1 to 5, preferably 1 to 3, injection planes, particularly preferably in one injection plane.

In this connection, it may be provided that each injection plane has 1 to 20, in particular 1 to 15, preferably 1 to 12, injection devices.

It may likewise be provided that the coolant is introduced into the exhaust-gas flow by means of 1 to 200, in particular 2 to 100, preferably 5 to 60, preferably 3 to 36, particularly preferably 1 to 12, injection devices.

In the context of the present invention, it is preferable if the injection devices are controlled individually and/or in groups, preferably individually.

Here, it has proven to be expedient for the discharge of the coolant from the injection devices to be controlled for each injection device individually and/or for groups of injection devices.

In the context of the present invention, particularly good results are obtained if the coolant is introduced into the exhaust-gas flow such that a desired, in particular preset, temperature profile of the exhaust-gas flow is set.

In this connection, it may be provided that a uniform temperature profile is set over the entire cross section of the exhaust-gas flow, and/or that a temperature profile with a non-uniform temperature distribution is set.

In general, it is provided in the context of the present invention that the introduction of the coolant into the exhaust-gas flow causes the exhaust-gas flow to be cooled in its entirety or in regions.

In this case, it may be provided that the entire cross section of the exhaust-gas flow is cooled, and/or selected regions of the cross section of the exhaust-gas flow, in particular perpendicular to the main flow direction of the exhaust-gas flow, are cooled.

As regards the temperatures to which the exhaust-gas flow is cooled, it has proven to be advantageous if the exhaust gases are cooled at least in regions to temperatures in the range from 750 to 1200° C., in particular 800 to 1150° C., preferably 850 to 1100° C.

In this case, it may be provided that the entire cross section of the exhaust-gas flow is cooled, and/or that selected regions of the cross section of the exhaust-gas flow are cooled.

It may likewise be provided in the context of the present invention that the introduction of the coolant into the exhaust-gas flow, in particular the quantity thereof and/or the time of introduction, is controlled by way of an evaluation of the load signal and/or the determination of the exhaust-gas temperature.

In this connection, it has proven to be expedient if the temperature of the exhaust gases is determined over the duration of the method at least at defined and/or predefined measurement points, and/or if at least one temperature profile of the exhaust gases, in particular in the form of one or more planes, is established, in particular by means of acoustic and/or optical temperature measurement, preferably acoustic temperature measurement.

Furthermore, particularly good results are obtained if, on the basis of the determined temperature values of the exhaust gases and/or of the determined temperature profile of the exhaust gases, the exhaust-gas flow is divided into sections, wherein the sections are assigned defined individual injection devices and/or defined groups of injection devices.

In a particularly preferred embodiment of the present invention, it is provided that the injection devices are controlled, in particular individually or in groups, on the basis of the determined temperature values of the exhaust gases and/or on the basis of the determined temperature profile of the exhaust gases and/or on the basis of the load signal.

Furthermore, in the context of the present invention, it may be provided that, at the same time as and/or subsequently to the selective cooling of the exhaust gases, further treatment, in particular for the reduction or removal of undesired constituents, of the exhaust gases is performed, and/or that, at the same time as and/or subsequently to the selective cooling of the exhaust gases, a method for further treatment, in particular for the reduction or removal of undesired constituents, of the exhaust gases is carried out.

In particular, in the context of the present invention, it may be provided that, at the same time as and/or subsequently to the selective cooling of the exhaust gases, further treatment for the reduction or removal of nitrogen oxides from the exhaust gases is performed, and/or that, at the same time as and/or subsequently to the selective cooling of the exhaust gases, a method for the reduction or removal of nitrogen oxides from the exhaust gases is carried out.

In this connection, it may be provided in particular that, at the same time as and/or subsequently to the selective cooling of the exhaust gases, at least one exhaust-gas treatment medium is introduced into and/or contacted with the exhaust-gas flow, in particular injected into the exhaust-gas flow. The exhaust-gas treatment medium is preferably a reducing agent for removing nitrogen oxides from the exhaust gases.

For further details regarding this aspect of the invention, reference may be made to the above statements regarding the other aspects of the invention, which apply correspondingly with regard to the method according to the invention for the selective cooling of exhaust gases.

The method according to the invention and the apparatus or installation according to the invention for the treatment of nitrogen oxide-containing exhaust gases from technical processes are illustrated by way of example, and in non-limiting fashion, in the appended FIGURE.

Further advantages, characteristics, aspects and features of the present invention will emerge from the following descriptions of preferred embodiments according to the invention that are illustrated in the drawing.

The single FIGURE (FIG. 1) is a schematic illustration of the apparatus 1 according to the invention for carrying out a method according to the invention.

The FIGURE shows a reactor 2 for carrying out the method according to the invention for the treatment of nitrogen oxide-containing exhaust gases from technical processes, such as flue gases. The apparatus according to the invention is normally connected downstream of a combustion boiler 11, for example the combustion boiler of a large combustion installation such as a combined heat and power plant or a waste incineration installation, and is situated directly upstream of the heat exchangers or heating surfaces 12 at which the heat energy is extracted from the flue gases and supplied for further use.

The reactor has a multiplicity of injection devices 3A and 3B for injecting a coolant into the reactor 2. The injection devices 3A and 3B are preferably arranged in one plane, wherein the designations 3A and 3B are intended merely to indicate that the injection devices are preferably designed to be individually controllable in order to permit cooling of the exhaust gases in regions, or the setting of a defined temperature profile of the flue gases.

Furthermore, the reactor 2 has a system for acoustic gas temperature measurement 16, said system being arranged directly upstream of the injection devices 3A/3B for injecting the coolant into the exhaust-gas flow.

Alternatively, the temperature measurement may also be performed downstream of a first injection plane for the coolant, wherein in this case, it is preferable for at least one further injection plane for the introduction of the coolant into the reactor 2 to be provided. It is likewise also possible for the temperature to be determined by means of multiple systems for acoustic gas temperature measurement 16.

On the basis of the temperature profile of the exhaust-gas flow as determined by way of the temperature measurement, the exhaust gases can be selectively cooled by injection of the coolant, and an ideal composition of the reducing agent, and the depth of penetration or the injection pressure and the droplet size or the droplet spectrum, can be set in targeted fashion. The reactor 2 furthermore has a multiplicity of injection devices 5 which, in the FIGURE, are arranged in three injection planes for illustrative purposes. The reducing agent is introduced into the reactor 2 through the injection devices 5. It is preferably the case that a mixture of different reducing agents is injected into the reactor 2 by means of the injection devices 5.

The injection devices 3A/3B for injecting the coolant are connected via a feed line 8A to a reservoir vessel 8 for the coolant. Furthermore, the injection devices 3A/3B are connected via a feed line 14A to a reservoir vessel 14 for dispensing compressed air. The injection devices 5 for injecting the reducing agent are connected via a feed line 14B to a reservoir vessel 14 for compressed air.

Furthermore, the injection devices 5 are connected to a mixing apparatus 15 which is connected via the supply lines 9A and 10A to the reservoir vessels 9 and 7 respectively which contain the reducing agents 6 (ammonia) and 7 (urea) in the form of their aqueous solutions. Furthermore, the mixing device 15 is connected via a feed line 13A to a reservoir vessel 13 for water.

It may however also alternatively be provided that, if water is used as coolant, only one common reservoir vessel for water is provided instead of the two reservoir vessels 8 and 13.

Furthermore, in a further alternative, it may be provided that the reservoir vessel 8 is likewise connected, via the feed line 8A, to the mixing device 15.

The same also applies to the reservoir vessel for compressed air 14, which in one alternative, may be connected via the feed lines 14A and 14B to the mixing device 15, wherein in this case, it may also be provided that, up to the mixing device 15, only a single feed line for compressed air is provided, and two compressed-air lines lead from the mixing device 15 to the injection devices 3A/3B and 5.

In a departure from the FIGURE, the mixing device 15 may preferably be connected to the injection lances 5 not via one supply line but via several; in particular, it is at least the case that each injection plane of injection lances 5 is connected via at least one dedicated supply line to the mixing device 15. For clarity, however, a multiplicity of supply lines has not been shown in the FIGURE.

The same also applies in the case of multiple injection planes of injection devices 3A/3B being provided for the injection of the coolant. It is also possible for the individual injection devices 3A/3B to be connected via multiple supply lines to the storage devices for the compressed air and for the coolant.

In the context of the method according to the invention, it is now preferably the case that, on the basis of a temperature profile of the flue gas determined by means of acoustic gas temperature measurement by means of the measurement devices 16, and on the basis of the load signal of the combustion boiler, water as coolant is injected, with exertion of pressure by the injection devices 3A/3B, into the reactor, whereby a preset temperature profile, in particular a consistent temperature distribution, of the flue gases is attained.

Furthermore, a base setting for the dosing or metering of the reducing agent into the reactor 2 is selected on the basis of the load signal of the combustion boiler.

Based on the temperature profile of the flue-gas flow determined by means of acoustic gas temperature measurement by means of the measurement devices 16, and the temperature profile of the flue-gas flow set through the injection of the coolant in the form of water, the ratios of ammonia solutions and urea solutions relative to one another are set in the mixing device 15, and the concentration of the reducing agents at the point of metering into the reactor is defined through the addition of process water.

Since a preset temperature profile of the exhaust gases is attained in the reactor 2 through the addition of water as coolant by means of the injection device 3A/3B, the specific mixing ratio of the reducing agents can be selected from a range of set mixing ratios and maintained over a relatively long period of time.

As an alternative to the diagram illustrated in the FIGURE, it is also possible for the respective ratios of ammonia solutions to urea and the overall concentration of the reducing agents in the solution injected into the reactor to be set individually for each injection device. According to the invention, however, it is preferable if, on the basis of the temperature profile set by way of the cooling, already preset constant parameters for the injection of the reducing agents can be worked with.

Through the feed line 14A and 14B, compressed air is then conducted to the respective injection lances, whereby the respective outlet pressure and thus the targeted depth of penetration and droplet size of the coolant and of the reducing agent solution are set in targeted fashion. It is however alternatively possible in this case, too, for the compressed-air regulation to likewise be defined by way of a mixing and dosing device together with the respective mixing of the reducing agents.

Further configurations, modifications, variations and special features of the present invention are readily apparent to a person skilled in the art reading the description, and can be realized without departing from the scope of the present invention.

The present invention will be presented on the basis of the following exemplary embodiments, without the present invention being restricted to these.

Exemplary Embodiments:

To show the effectiveness of the method according to the invention and of the apparatus according to the invention, the subject of the present invention will be explained by way of example on the basis of the following exemplary embodiments. According to the invention, the method is carried out using an apparatus such as is illustrated schematically and by way of example in the single FIGURE.

The method according to the invention for the reduction of nitrogen oxides from flue gases will be demonstrated on the basis of a mineral coal-fired boiler from the prior art at full load (225 $MW_{el}$). The flue gases have a temperature gradient of 120° C. upon exiting the combustion boiler. An apparatus according to the invention for reducing the nitrogen oxide content of flue gases is fitted between the boiler and the heat exchangers of the installation. The apparatus according to the invention is composed of a reaction chamber into which water as coolant is injected via ten injection lances which are fitted in one injection plane. Fitted directly upstream of said injection plane is an acoustic temperature measurement system which makes it possible to establish a temperature profile of the flue-gas flow and thereby control the injection lances.

Downstream of said injection plane, ammonia water (25 wt % $NH_3$ in relation to the ammonia water), urea solution (40 wt % urea in relation to the solution) and mixtures of the two liquids are injected by means of 36 injection lances distributed over 3 injection planes each with 12 injection lances.

In each case upon the commencement of the method and/or at regular intervals over the duration of the method, the nitrogen oxide load of the untreated gas, that is to say of the exhaust gas that has not yet undergone treatment, is measured in order to thereby permit, in combination with load signals, a coarse setting of the exhaust-gas treatment device, in particular with regard to the injection of the reducing agent.

Throughout the further duration of the method, the nitrogen oxide loads of the treated exhaust gases (that is to say of the purified gases) and the ammonia slippage are determined, whereby fine adjustment of the method according to the invention and/or of the apparatus according to the invention is made possible.

Multiple test series are carried out: firstly, three non-inventive methods are carried out which are based on the use of ammonia solutions or urea solutions or the mixtures thereof but without prior cooling of the exhaust gases.

Subsequently, method runs in accordance with the method according to the invention are carried out which are based on prior cooling and the setting of a preset temperature profile of the exhaust gases. In none of the test series do the aqueous solutions of the reducing agents have additional water added thereto. The results of the method runs are summarized in table 1.

As can be seen from the data from table 1, both the injection of urea on its own and also the injection of ammonia solution on its own without prior cooling of the flue gases yield a reduction of the nitrogen oxide content of the exhaust gases that does not adhere to the present legal limit values. This is owing in particular to the fact that the boiler has a considerable temperature gradient and the temperature range expedient for optimum reduction is, at full load, situated in the region of the heat exchangers, which region is, in part, difficult to reach by means of the injection devices. Furthermore, injection of the reducing agents into excessively hot regions of the exhaust-gas flow promotes oxidation of the introduced reducing agents to form nitrogen oxides. In reaction to this, the injected amount of reducing agent is increased, which then in turn leads to increased ammonia slippage and thus to critical contamination of the fly ash with ammonia or ammonium salts.

In contrast to the use of ammonia, the use of urea on its own results in a considerable improvement in ammonia slippage, that is to say reduced ammonia slippage, but leads to considerable corrosion on the heat exchangers because, in particular at high loads of the boiler, injection is necessary in the region of the heat exchangers in order to lower the nitrogen oxide content of the flue gases to the desired level. Of the non-inventive methods, only a joint injection of ammonia and urea, wherein the ratio of ammonia to urea is varied in the range from 1:99 to 99:1, yields satisfactory results with regard to the separating-off of the nitrogen oxides, wherein the legal limit value of 200 mg/Nm³ is only just undershot. However, this method also exhibits a critically high level of ammonia slippage and high consumption of reducing agent.

Considerably better results are obtained with the aid of the method according to the invention, wherein all of the measurement series lie far below the legally prescribed maximum limits for the nitrogen oxide load of the exhaust gases. Furthermore, the ammonia slippage is also considerably reduced in relation to the method runs without prior cooling of the flue gases. However, in this case too, the best results are obtained with a combination of the cooling of the flue gases and the injection of a mixture of ammonia solution and urea solution as reducing agent. Furthermore, in this method run, the consumption of reducing agents is also reduced by 12% in relation to an injection of ammonia and urea solution without prior cooling of the flue gases.

TABLE 1

| Reducing agent | Ratio NH₃:urea | NOₓ untreated gas mg/Nm³ | NOₓ purified gas mg/Nm³ | dNOx mg/Nm³ | NH₃ slippage mg/Nm³ | Corrosion |
|---|---|---|---|---|---|---|
| NH₃ * | 100% NH₃ | 453 | 223 | 230 | 16.5 | No |
| Urea * | 100% urea | 448 | 205 | 243 | 12.7 | Yes |
| NH₃/urea * | 1:99 to 99:1 | 446 | 198 | 248 | 9.8 | No |
| NH₃ * | 100% NH₃ | 458 | 195 | 263 | 8.7 | No |
| Urea * | 100% urea | 460 | 187 | 273 | 8.4 | Yes |
| NH₃/urea * | 1:99 to 99:1 | 451 | 123 | 328 | 5.2 | No |

* not according to the invention

While Applicant's invention has been described in detail above with reference to specific embodiments, it will be understood that modifications and alterations in embodiments disclosed may be made by those practiced in the art without departing from the spirit and scope of the invention. All such modifications and alterations are intended to be covered. In addition, all publications cited herein are indicative of the level of skill in the art and are hereby incorporated by reference in their entirety as if each had been individually incorporated by reference and fully set forth.

The invention claimed is:

1. A method for the treatment of nitrogen oxide-containing flue gases from technical processes for the purposes of removing or separating off the nitrogen oxides or for the purposes of reducing the nitrogen oxide content, wherein:
   (a) in a first method step, the flue gases are selectively cooled, wherein at least one coolant is introduced into or contacted with the flow of flue gases, wherein the coolant is a cooling liquid, wherein the coolant is introduced into the flue-gas flow by means of injection devices, wherein the introduction of the coolant into the flue gas flow causes the flue-gas flow to be cooled in its entirety or in regions, and wherein the flue gases are cooled to temperatures in the range from 750 to 1,200° C.; and
   (b) in a simultaneous or subsequent second method step, the nitrogen oxides are removed or separated off from the flue gases by means of chemical reduction of the nitrogen oxides, wherein at least one nitrogen-containing reducing agent is contacted with the nitrogen oxide-containing flue gases or introduced into the flow of the nitrogen oxide-containing flue gases;
   wherein at least one temperature profile of the flue gases is established, wherein, on the basis of the determined temperature profile of the flue gases, the flue-gas flow is divided into sections, wherein the sections are assigned defined individual injection devices for introducing the coolant into the flue-gas flow or defined groups of injection devices for introducing the coolant into the flue-gas flow, wherein the injection devices for introducing the coolant into the flue-gas flow are controlled, individually or in groups, on the basis of the determined temperature profile of the flue gases or on the basis of the load signal, wherein the coolant is introduced into the flue-gas flow such that a desired temperature profile over a cross-section of the flue-gas flow is set.

2. The method, as claimed in claim 1, wherein the coolant is introduced in finely distributed form into the flue-gas flow.

3. The method as claimed in claim 1, wherein each injection device comprises one or more nozzles for introducing the coolant into the flue-gas flow, wherein the injection devices are arranged in 1 to 10 injection planes, wherein each injection plane comprises 1 to 20 injection devices.

4. The method as claimed in claim 1, wherein the flue gases ore cooled to temperatures in the range from 800 to 1,150° C., wherein the entire cross section of the flue-gas flow or one or more selected regions of the cross section of the flue-gas flow are cooled.

5. The method as claimed in claim 1, wherein the reducing agent used is in the form of an aqueous solution, wherein, as reducing agent, use is made of at least one of ammonia and urea.

6. The method as claimed in claim 1,
wherein the reducing agent is introduced into the flue-gas flow by means of injection devices, wherein each injection device comprises one or more nozzles for introducing the reducing agent into the flue-gas flow.

7. The method as claimed in claim 6,
wherein the injection devices for introducing the reducing agent into the flue-gas flow are arranged in 1 to 10 injection planes, wherein each injection plane comprises 1 to 20 injection devices;
wherein the reducing agent is introduced into the flue-gas flow by means of 1 to 200 injection devices;
wherein the injection devices for introducing the reducing agent into the flue-gas flow are controlled individually or in groups, wherein the discharge of the reducing agent from the injection devices is controlled for each injection device individually or for groups of injection devices.

8. The method as claimed in claim 1,
wherein different injection devices are used for the coolant and for the reducing agent.

9. The method as claimed in claim 1,
wherein the coolant is introduced into the flue-gas flow at the same time as or temporally prior to the introduction of the reducing agent and wherein the coolant and the reducing agent are introduced into the flue-gas flow in alternation or in a defined sequence.

10. The method as claimed in claim 1,
wherein the introduction of the reducing agent into the flue-gas flow as well as the quantities thereof and the time of introduction are controlled by way of the determination of at least one of the flue-gas temperature and of the residual nitrogen oxide content in the purified gas that results from the treatment.

11. The method as claimed in clam 10,
wherein the introduction of the reducing agent into the flue-gas flow is controlled by way of at least one of (i) an evaluation of the load signal, (ii) a determination of the flue-gas temperature and (iii) a comparison between, on the one hand, a measured value for the residual nitrogen oxide content in the purified gas that results from the treatment and, on the other hand, a predefined setpoint value.

12. The method as claimed in claim 1,
wherein at least one temperature profile of the flue gases in the form of one or more planes is established by means of temperature measurement; and
wherein, on the basis of the determined temperature values of at least one of the flue gases and the determined temperature profile of the flue gases, the flue-gas flow is divided into sections, wherein the sections are assigned defined individual injection devices for introducing the reducing agent into the flue-gas flow or defined groups of injection devices for introducing the reducing agent into the flue-gas flow.

13. The method as claimed in claim 1,
wherein the injection devices for introducing the reducing agent into the flue-gas flow are controlled, individually or in groups, on the basis at least of one of (i) the determined temperature values of the flue gases, (ii) the determined temperature profile of the flue gases, (iii) the load signal and (iv) a comparison between, on the one hand, a measured value for the residual nitrogen oxide content in the purified gas that results from the treatment and, on the other hand, a predefined setpoint value.

14. The method as claimed in claim 1,
wherein the injection devices for introducing the coolant and the injection devices for introducing the reducing agent are controlled jointly on the basis of at least one of (i) the determined temperature values of the flue gases, (ii) the determined temperature profile of the flue gases and (iii) the load signal, wherein the injection devices for introducing the coolant and the injection devices for introducing the reducing agent are controlled in an inter-coordinated manner.

15. A method for the treatment of flue gases from technical processes selected from flue gases, for the purposes of cooling the flue gases, as part of a method for removing or separating off nitrogen oxides from flue gases from technical processes, namely as part of a method for the denitrification of flue gases from large technical installations,
wherein a flow of flue gases to be treated is subjected to a selective cooling, wherein at least one coolant is introduced into or contacted with the flow of the flue gases, wherein the coolant is a cooling liquid, wherein the coolant is introduced into the flue-gas flow by means of injection devices, wherein the introduction of the coolant into the flue-gas flow causes the flue-gas flow to be cooled in its entirety or in regions, wherein at least one temperature profile of the flue gases in the form of one or more planes is established, wherein, on the basis of the determined temperature profile of the flue gases, the flue-gas flow is divided into sections, wherein the sections are assigned defined individual injection devices for introducing the coolant into the flue-gas flow or defined groups of injection devices for introducing the coolant into the flue-gas flow, wherein the injection devices for introducing the coolant into the flue-gas flow are controlled individually or in groups on the basis of at least one of (i) the determined temperature profile of the flue gases and (ii) the load signal, wherein the coolant is introduced into the flue-gas flow such that a desired temperature profile over a cross-section of the flue-gas flow is set.

16. An apparatus for the treatment of nitrogen oxide-containing flue gases from technical processes for the purposes of removing or separating off the nitrogen oxides or for the purposes of reducing the nitrogen oxide content by means of chemical reduction of the nitrogen oxides,
wherein the apparatus comprises:
(a) a reactor for contacting at least one coolant and at least one reducing agent with nitrogen oxide-containing flue gases, wherein the reactor comprises a multiplicity of injection devices for the introduction of the at least one coolant and a multiplicity of injection devices for the introduction of the at least one nitrogen-containing reducing agent, wherein the injection devices can be regulated individually or in groups;
(b) at least one first storage device, which is assigned to the reactor and which is connected, via at least one feed line, to the injection devices and which serves for storing and releasing the at least one coolant;
(c) at least one second storage device, which is in particular assigned to the reactor and which is connected, via at least one feed line, to the injection devices (5) and which serves for storing and releasing the at least on reducing agent; and
(d) a measurement device for establishing a temperature profile of the flue gases;
wherein the introduction of the coolant into the flue-gas flow can be controlled by way of at least of one of (i) a determination of temperature values of the flue gases and (ii) a determination of a temperature profile of the flue gases and (iii) a load signal;

wherein the introduction of the reducing agent into the flue-gas flow can be controlled by way of at least one of (i) a determination of temperature values of the flue gases, (ii) a determination of a temperature profile of the flue gases, (iii) a load signal and (iv) a comparison between, on the one hand, a measured value for the residual nitrogen oxide content in the purified gas that results from the treatment and, on the other hand, a predefined setpoint value;

wherein a temperature profile over a cross-section of the flue-gas flow can be set by way of the introduction of the coolant into the flue-gas flow; and wherein the flue-gas flow can be set at least in regions to temperatures in the range from 750 to 1,200° C. by way of the introduction of the coolant;

wherein the apparatus has, arranged upstream of the injection devices for introducing the coolant, a measurement device for determining the temperature of the flue gas or for establishing a temperature profile of the flue gas by means of acoustic or optical temperature measurement.

17. An apparatus for the treatment of nitrogen oxide-containing flue gases from technical processes for the purposes of removing or separating off the nitrogen oxides or for the purposes of reducing the nitrogen oxide content by means of chemical reduction of the nitrogen oxides, wherein the apparatus comprises:

(a) a reactor for contacting at least one coolant and at least one reducing agent with nitrogen oxide-containing flue gases, wherein the reactor comprises a multiplicity of injection devices for the introduction of the at least one coolant and a multiplicity of injection devices for the introduction of the at least one nitrogen-containing reducing agent, wherein the injection devices can be regulated individually or in groups;

(b) at least one first storage device, which is assigned to the reactor and which is connected, via at least one feed line, to the injection devices and which serves for storing and releasing the at least one coolant;

(c) at least one second storage device, which is in particular assigned to the reactor and which is connected, via at least one feed line, to the injection devices (5) and which serves for storing and releasing the at least one reducing agent; and (d) a measurement device for establishing a temperature profile of the flue gases;

wherein the introduction of the coolant into the flue-gas flow can be controlled by way of at least of (i) a determination of temperature values of the flue gases and (ii) a determination of a temperature profile of the flue gases and (iii) a load signal;

wherein the introduction of the reducing agent into the flue-gas flow can be controlled by way of at least one of (i) a determination of temperature values of the flue gases, (ii) a determination of a temperature profile of the flue gases, (iii) a load signal and (iv) a comparison between, on the one hand, a measurer value for the residual nitrogen oxide content in the purified gas that results from the treatment and, on the other hand, a predefined setpoint value;

wherein a temperature profile over a cross-section of the flue-gas flow can be set by way of the introduction of the coolant into the flue-gas flow; and wherein the flue-gas flow can be set at least in regions to temperatures in the range from 750 to 1,200° C. by way of the introduction of the coolant;

wherein the apparatus is used for performing the method of claim 1.

* * * * *